(12) United States Patent
McKenzie

(10) Patent No.: US 6,726,030 B1
(45) Date of Patent: Apr. 27, 2004

(54) STANDPIPE ELEMENT SUPPORT FOR LIQUID FILTER

(75) Inventor: Darrell T. McKenzie, Gastonia, NC (US)

(73) Assignee: Dana Corporation, Toledo, OH (US)

(*) Notice: Subject to any disclaimer, the term of this patent is extended or adjusted under 35 U.S.C. 154(b) by 1 day.

(21) Appl. No.: 10/114,069

(22) Filed: Apr. 3, 2002

(51) Int. Cl.[7] .................... B01D 27/08; B01D 35/30
(52) U.S. Cl. .................... 210/438; 210/232; 210/437; 210/440; 210/443; 210/DIG. 17
(58) Field of Search .................... 210/232, 437, 210/438, 440, 441, 442, 443, DIG. 17

(56) References Cited

U.S. PATENT DOCUMENTS

| | | | |
|---|---|---|---|
| 3,567,023 A | * | 3/1971 | Buckman et al. .... 210/DIG. 17 |
| 3,690,460 A | * | 9/1972 | Lindboe .................... 210/440 |
| 3,773,180 A | * | 11/1973 | Harrison .................... 210/443 |
| 5,525,225 A | | 6/1996 | Janik et al. |
| 5,837,137 A | | 11/1998 | Janik |
| 6,048,455 A | | 4/2000 | Janik |
| 6,187,188 B1 | | 2/2001 | Janik et al. |

* cited by examiner

*Primary Examiner*—David A. Reifsnyder
(74) *Attorney, Agent, or Firm*—Millen, White, Zelano & Branigan, P.C.

(57) ABSTRACT

An annular filter element defining a hollow core is mounted within a cylindrical housing having a closed end and an open end by using a single piece, molded insert. The single pieces molded insert has a cup portion which extends into the hollow core of the filter element and a cylindrical portion which projects from the end of the filter element. A radially extending flange projects from the insert and engages the end of the filter element while a scalloped end of the cylindrical portion abuts the closed end of the housing. The scalloped end has a series of triangular openings The cup portion of the insert has an opening through the bottom thereof which receives a standpipe on a filter element support.

10 Claims, 2 Drawing Sheets

STANDPIPE ELEMENT SUPPORT FOR LIQUID FILTER

FIELD OF THE INVENTION

The present invention is directed to a standpipe support for filters, more particularly, the present invention is directed to a combination of a filter element and housing with a standpipe support.

BACKGROUND OF THE INVENTION

Filters, such as liquid filters for lubricating oil and fuel used in internal combustion engines, utilize several parts. Literally, there are a plurality of parts which are necessary in order to introduce dirty liquid into a filter and to remove clean liquid from the filter. With one type of filter, typical of filters employed for filtering liquids, there are parts which form an assembly necessary to introduce and remove liquid from the filter. For example, such a filter might include four stamped metal parts, two fiber sealing washers, one fiber standpipe and one coil spring. It is expensive to buy and assemble these parts in order to configure the filter. Moreover, when it is necessary to assemble separate parts, the junctures between these parts provide opportunities for assembly errors and opportunities for filter failure due to just one part being defective. Accordingly, by reducing the number of parts, expense is reduced and reliability enhanced.

In view of these and other considerations, there is a need for filters which are configured of a reduced number of parts.

SUMMARY OF THE INVENTION

The present invention is utilized with and directed to a filter which comprises an annular filter element having a hollow core and mounted in a housing which forms an annular space around the filter element. The housing has a closed end and an open end, the open end being adapted and arranged to receive unfiltered fluid and to expel filtered fluid. An insert configured according to the invention is positioned within the hollow core and has a first end in abutment with the closed end of the housing and a second end in communication with one of the openings of the housing. The insert includes a shoulder engaging one end of the filter element and has radial openings adjacent the first end thereof so that fluid may pass therethrough.

In a more specific aspect of the invention, the insert has an opening in the second end thereof which receives fluid to be filtered and transports the fluid past the filter element so that the fluid flows into the annular space around the filter element; then radially through the filter element into the hollow core as filtered liquid, and then out of the core for reuse.

In still a more specific aspect of the invention the insert is a single piece, more particularly a single piece of molded material such as, but not limited to, resilient material, for example, rubber or nitrile rubber.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
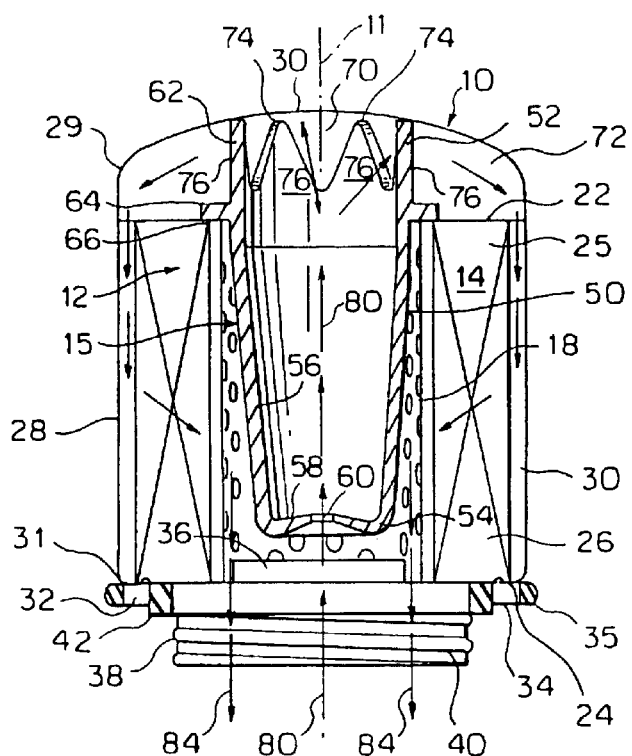
FIG. 1 is a side elevation of a filter configured in accordance with the principles of the present invention.

Referring now to FIG. 1, there is shown a filter 10 configured around a longitudinal axis 11 in accordance with the principles of the present invention. The filter 10 includes an annular filter element 12 comprised of a filter media 14 which defines a hollow core 15 within a perforated tube 18. The filter media 14 is in the illustrated embodiment is a pleated paper media which may be made of paper or some other filter material and has end caps 22 and 24 at first and second ends 25 and 26, respectively thereof.

The annular filter element 12 is mounted in a cylindrical housing 28 which has a first end 29 close by a dome 30 and a second end 32 which is open. The open end 32 of the housing 28 is closed by an annular abutment in the form of an end plate 34 which is crimped to the housing 28 by a crimped rim 35. The end plate 34 includes a fluid passage 36 and a threaded collar 38 projecting outwardly. Entrance and exit of dirty fluid and clean fluid, respectively passes through the fluid passage 36 and threaded collar 38. A rubber or rubber-like gasket 42 is disposed around the fluid passage 36 to seal with a surface 45 on the filter element 44 of FIG. 2 when the threaded collar 38 is screwed over a complementary threaded opening 46 of on the filter element support 44.

In accordance with the principles of the present invention, an insert 50 is disposed within the hollow core 15 of the filter element 12. The insert 50 includes a first end 52 which is scalloped and a second end 54, the second end 54 being the bottom of a frusto-conical shaped cup 56. The frusto-conical shaped cup 56 has a bottom 58 which is externally concave and has a round opening 60 therethrough. The frusto-conical portion of the cup merges with a generally cylindrical portion 62 that is positioned externally of the hollow core 15 of the filter element 12. The cylindrical portion 62 has a radially projecting flange 64 which has a surface 66 defining a shoulder which rests on the first end 25 of the filter element 12. The first end 52 has a series of openings 70 therein which open radially to allow fluid to flow from within the insert 50 into the space 72 between the domed end 30 and first end 25 of the filter element 12. In a preferred embodiment of the invention, the first end 52 is scalloped and the openings 70 are v-shaped notches which terminate in points 74 that abut the inside surface of the domed end 30 of housing 28.

Since in a preferred embodiment, the insert is molded of a resilient material, the triangular notches are defined by triangular projections each of which flex slightly and bias the insert back toward the end plate 34 which closes the open end 32 of the housing 28. Because the surface 66 engages the first end 25 of the filter element 12, the filter element urges the second end 26 thereof against the end plate 34 to provide an arrangement where the filter element and insert are held in fixed relation within the housing 28.

In a preferred embodiment of the invention, the dirty fluid to be filtered enters the inlet opening 60 as a stream 80 through the bottom 58 of the cup 56 comprising the insert 50 and exists the insert through the openings 70. The dirty fluid then flows into the end space 72 and from the end space 72 into the annular space 30 between the housing 28 and filter media 14. The fluid then flows radially through the filter media 14 into the hollow core 15. From the hollow core 15 the fluid flows back out of the fluid passage 36 as an outlet stream 84.

Figure 2:
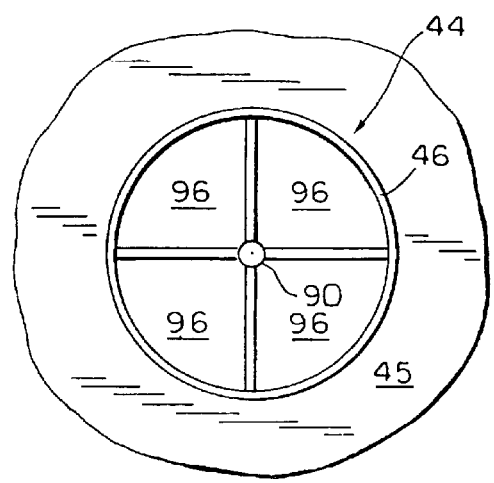
FIG. 2 is a planar view of a type of filter support upon which the filter of FIG. 1 is mounted.

In order to keep the inlet stream 80 separate from the outlet stream 84, the inlet stream 80 flows through a standpipe 90 projecting from the filter element support 44 of FIG. 2. The threaded opening 46 of the filter element support 44 receives the spiral threads of the threaded collar 38 around which the seal 32 is positioned so that the dirty inlet fluid flows in through the standpipe 90 that passes through the inlet hole 60 in the insert 50 and the outlet fluid flows around the standpipe 90 and through outlet passages 96 which are positioned radially around the standpipe.

While the flow arrangement of FIG. 1 is a preferred arrangement, it is of course possible to have the fluid flow in the other direction so that the inlet fluid flows radially outward through the filter media and then into the insert 50 after being cleaned. The fluid would then flow from the cup 56 of the insert 50 out of the opening 60 in the bottom of the cup.

Figure 3:
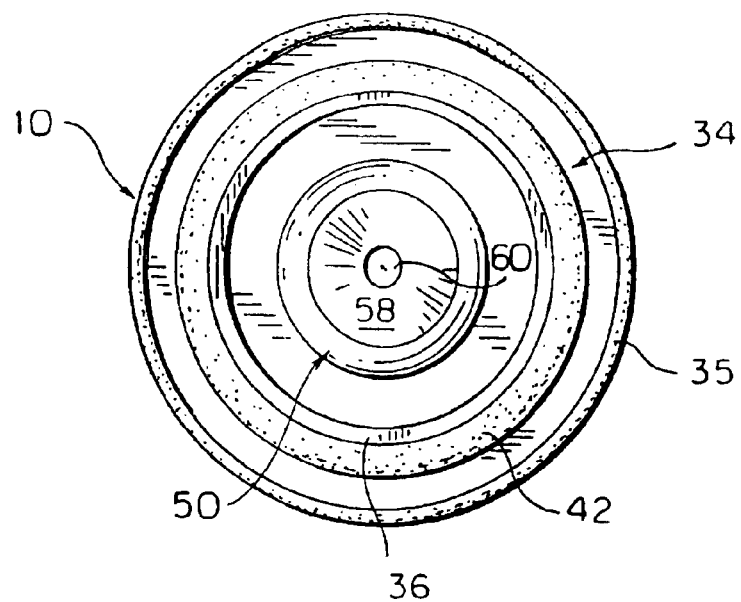
FIG. 3 is a bottom view of the filter of FIG. 1.

Referring now to FIG. 3, it is seen that the open of the filter 10 has structure which cooperates with the filter support 44 to attach the filter to the filter support.

Figure 4:
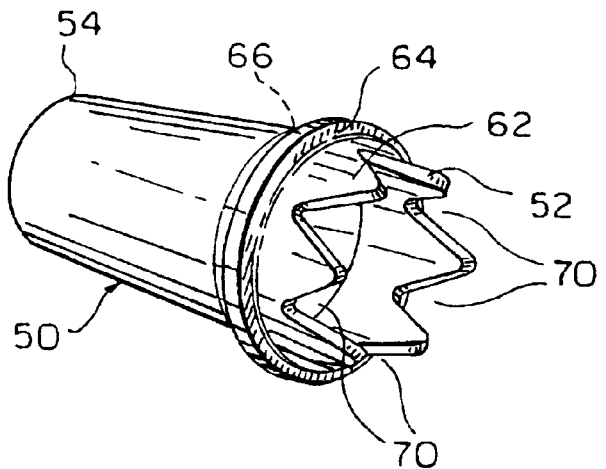
FIG. 4 is a side perspective view of an insert according to the present invention mounted within the filter of FIG. 1.

Referring now to FIG. 4, it is seen that the insert 50 is preferably a unitary molded element, preferably molded from rubber, nitrile rubber or some other resilient material which is preferably, but not limited to a plastic material. The insert 50 shown in FIG. 4 used in place of numerous other component parts and provides the function of locating the filter element 12 within the housing 28 and of channeling dirty and clean fluid into and out of the open end of the filter 10 defined by the fluid passage 36.

From the foregoing description, one skilled in the art can easily ascertain the essential characteristics of this invention, and without departing from the spirit and scope thereof, can make various changes and modifications of the invention to adapt it to various usages and conditions.

I claim:

1. A filter comprising:
   an annular filter element having a hollow core and mounted in a housing which forms an annular space around the filter element, the housing having a closed end and an open end, the open end having an annular abutment allowing passage of the fluid therethrough, and
   an insert having a first end in abutment with the closed of the housing and a second end having an opening for communication with the open end of the housing, the insert further having a shoulder engaging one end of the filter element and radial openings adjacent the first end thereof for passage of fluid therethrough.

2. A filter according to claim 1 wherein the insert has a cup portion extending into the hollow portion of the housing, the cup portion having the first opening therethrough for receiving dirty inlet fluid which flows through the cup portion and out of the radial openings adjacent the first end of the insert and then into the annular space around the filter element before flowing radially through the filter element and into the hollow core as clean outlet fluid.

3. A filter according to claim 2 wherein the filter element directly abuts both the annular abutment and the shoulder on the insert and the insert abuts only the filter element and the closed end of the housing.

4. A filter according to claim 2 wherein the insert is made of resilient material and biases the filter element toward the annular abutment at the open end of the housing.

5. A filter according to claim 4 wherein the filter element directly abuts both the annular abutment and the shoulder on the insert and the insert abuts only the filter element and the shoulder on the insert and the insert abuts only the filter element and the closed end of the housing.

6. A filter according to claim 4 wherein the annular abutment is an end plate with a threaded opening therethrough for coupling with a threaded opening in a filter support.

7. A filter according to claim 6 wherein the filter element directly abuts both the annular abutment and the shoulder on the insert and the insert abuts only the filter element and the closed end of the housing.

8. A filter according to claim 4 wherein the filter element directly abuts both the annular abutment and the shoulder on the insert and the insert abuts only the filter element and the closed end of the housing.

9. A filter element according to claim 1 wherein the insert is made of a resilient material and biases the filter element toward the open end of the housing and wherein the filter element directly abuts both the annular abutment and the shoulder on the insert and the insert abuts only the filter element and the closed end of the housing.

10. The filter element of claim 9 wherein the resilient material is rubber or nitrile rubber.

* * * * *